United States Patent
Rabinovich (10) Patent No.: US 6,880,078 B2
(45) Date of Patent: Apr. 12, 2005

(54) XAUI EXTENDER CARD

(75) Inventor: Ricardo O. Rabinovich, Tarzana, CA (US)

(73) Assignee: Spirent Communications, Agoura Hills, CA (US)

( * ) Notice: Subject to any disclaimer, the term of this patent is extended or adjusted under 35 U.S.C. 154(b) by 169 days.

(21) Appl. No.: 10/289,945

(22) Filed: Nov. 6, 2002

(65) Prior Publication Data

US 2004/0088133 A1 May 6, 2004

(51) Int. Cl.$^7$ .............................................. G06F 13/14
(52) U.S. Cl. ....................... 713/100; 714/701; 324/754; 324/758
(58) Field of Search ........................ 713/100; 714/701; 324/754, 758

(56) References Cited

U.S. PATENT DOCUMENTS

| | | | |
|---|---|---|---|
| 5,119,020 A | * | 6/1992 | Massey et al. .............. 324/754 |
| 6,141,327 A | * | 10/2000 | Kalkunte et al. ........... 370/252 |
| 6,295,572 B1 | * | 9/2001 | Wu ............................. 710/316 |
| 6,636,058 B2 | * | 10/2003 | Lyford ....................... 324/754 |
| 6,718,491 B1 | * | 4/2004 | Walker et al. .............. 714/701 |
| 2003/0217215 A1 | * | 11/2003 | Taborek et al. ............. 710/305 |
| 2004/0047408 A1 | * | 3/2004 | Koenenkamp et al. ...... 375/224 |

* cited by examiner

Primary Examiner—A. Elamin
(74) Attorney, Agent, or Firm—The Hecker Law Group, PLC (57) ABSTRACT

Access to the XAUI lanes of a 10 Gigabit Ethernet device is provided when needed for testing of the XAUI electrical interface. Access is provided by extending the XAUI interface contained in a XENPAK interface connector. An embodiment of the present invention uses an extension of the XENPAK connector to generate and receive XAUI signals thus making it possible for any device with a XENPAK connector to become a XUAI tester with minimal components between the test equipment and the device under test. The reduction of components (only an AC-Coupling capacitor resides between the XENPAK connector and the SMA connector) results in significant reduction in insertion loss and signal degradation. Also, the availability of any device with a XENPAK interface as a XAUI tester eliminates any requirement for specialized test equipments. The XAUI Extender card fits in the slot in the test equipment that would normally house the XENPAK module. Thus, no special connector is required to configure a device as a test equipment of the present invention.

18 Claims, 9 Drawing Sheets

XAUI EXTENDER CARD

BACKGROUND OF THE INVENTION

1. Field of the Invention

This invention relates to the field of transport photonics. More specifically the invention relates to physical layer transport testing of the integrity of optical network components.

2. Background Art

Originally, communication networks were constructed of copper wires for transmission of electrical signals to communicate data and sound. To facilitate communication, Ethernet technology was developed to aid in interconnecting electronic equipments. The Institute of Electrical and Electronics Engineering (IEEE) subsequently adopted the Ethernet and provided basically an open system standard such that products developed by different vendors, in compliance with the standard, are able to communicate with each other and transfer data from point-to-point over twisted pair cables (e.g., Category 5 cable). Thus today a majority of networks use Ethernet standards for communication over copper wires. Standards currently in use for Local Area Networks (LAN) and some Metro Area Networks (MAN) include the 10 Megabit, 100 Megabit, and 1 Gigabit Ethernet.

However, the demand created by a larger number of customers, need for increased data transfer rates, as well as increased communication distances, resulted in the proliferation of fiber optic transmission networks. Fiber optic transmission was attractive because of the very limited data carrying capability (i.e., low bandwidth) of electrical signal transmission medium (e.g., copper) in contrast with an optical transmission medium. Moreover, electrical based communication systems suffer from power losses (due to diffusion and skin effect) that accompany copper based transmission lines. Thus, in the telecommunications technology, optical fibers and optical fiber cables have become the transmission media of choice, primarily because of the tremendous bandwidth capabilities and low power loss associated with optical fibers. To this effect, faster and faster communication standards are being developed to feed this insatiable demand for speed. One of these standards is the 10-Gigabit Ethernet standard.

The 10 Gigabit Ethernet Standard extends the current IEEE 802.3 protocols to an operating speed of 10 Gigabits per second. The new protocol also allows for expansion of Ethernet applications to include Wide Area Networks (WAN). Unlike earlier Ethernet Standards, the 10-Gigabit Ethernet Standard, known as the IEEE 802.3ae, will only function over fiber optic transmission lines and only operate in full duplex mode therefore rendering collision detection protocols unnecessary.

A consortium of companies formed an alliance, the 10 Gigabit Ethernet Alliance, to promote this new standard for optical fiber transmission. The descriptions that follow are freely adopted from white papers published by the 10 Gigabit Ethernet Alliance.

The 10-Gigabit Ethernet (10 GbE) technology represents the merging of technologies between telecommunications and data communications. The IEEE 802.3ae Standard is a 10-Gigabit Ethernet standard developed to ensure interoperability between products from different vendors using optical fiber transmission medium for data communication. The 10 GbE does not obsolete current network infrastructure because it is designed to be interoperable with other networking technologies such as SONET (Synchronous Optical Network). Thus the standard enables Ethernet packets to travel across SONET links with very little inefficiency.

SONET is the American National Standards Institute standard for synchronous data transmission on optical media. The international equivalent of SONET is synchronous digital hierarchy (SDH). Together, they ensure standards so that digital networks can interconnect internationally and that existing conventional transmission systems can take advantage of optical media through tributary attachments.

The 10-Gigabit standard uses the Ethernet's Media Access Control protocol, the frame format, and the minimum and maximum frame size of the IEEE 802.3. The standard is a full duplex and fiber only technology therefore it does not require carrier-sensing, multiple-access with collision detection (CSMA/CD) protocol of slower, half-duplex Ethernet technologies.

Under the International Standards Organization's Open Systems Interconnection (OSI) model, Ethernet is basically a 2-layer protocol: the physical layer (PHY), and the Media Access Control Layer (MAC). The 10-Gigabit Ethernet Standard adopts cost effective and robust technologies to minimize transitional costs to the 10-Gigabit Ethernet. For instance, the standard basically specifies the physical layer while specifying only minimal changes to current Media Access Control devices.

Figure 1:
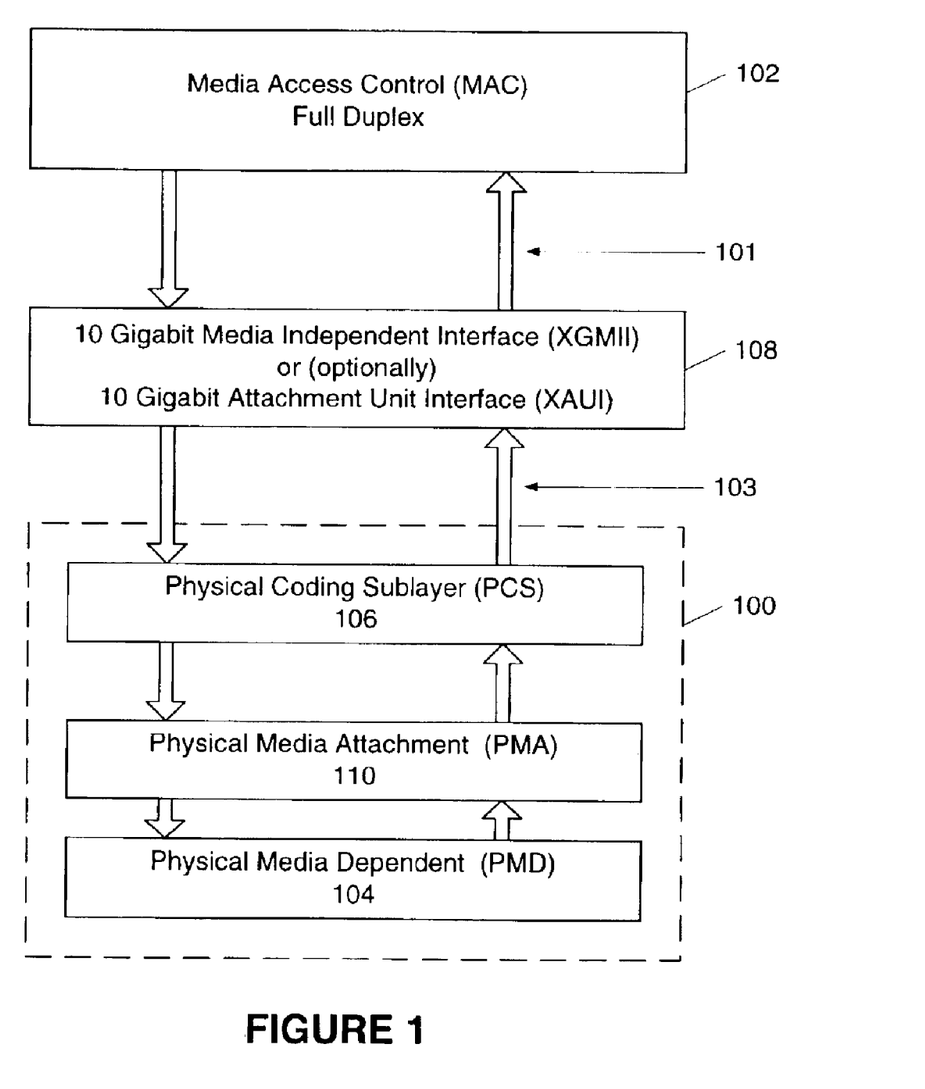
FIG. 1 is an illustration of the Open Systems Interconnection Ethernet model.

An Ethernet PHYsical layer device (PHY), which corresponds to layer 1 of the OSI model, connects through an optical or copper medium to the MAC layer, which corresponds to OSI layer 2. The OSI Ethernet model is illustrated in FIG. 1. As illustrated, block 100 represents the physical layer device and block 102 represents the MAC layer device. The Ethernet structure further divides the PHY, block 100, into a Physical Media Dependent sublayer (PMD) 104, Physical Media Attachment (PMA) 110, and a Physical Coding Sublayer (PCS) 106. Optical transceivers, for example, are PMDs. Thus the PMD converts optical signals to electric and vise versa. PMA 110 is a serializer/deserializer sublayer. And finally, PCS 106 comprises coding (e.g., 64B/66B or 8B/10B) and serializer or multiplexing functions.

Between the MAC and the PHY is XGMII 108, or 10 Gigabit Media Independent Interface (XGMII), 108. The XGMII provides simple, inexpensive, and easy to implement interconnection between the MAC sublayer and the PHY. Transmission lines 101 and 103 carry full duplex XGMII traffic at 10 Gb/second between the MAC and the PHY. Each direction is independent and contains a 32-bit data path, as well as clock and control signals. In total, the XGMII is a 74-bit wide bus. A 10 Gigabit Attachment Unit Interface (XAUI) is optionally used in place of or to extend the operational distance of the XGMII with reduced pin count (see Clause 47 of the IEEE 802.3ae Standard).

XAUI is a full duplex interface that uses four self-clocked serial differential links in each direction to achieve 10 Gb/s data throughput. Each serial link operates at 3.125 Gb/s to accommodate both data and overhead associated with 8B/10B coding. The XAUI interface is self-clocked thus eliminating any skew concerns between the clock and data, and extends the functional reach of the XGMII by approximately another 50 cm (from 7 cm). Conversion between the XGMII and XAUI occurs at a sublayer called the XGMII Extender Sublayer (XGXS).

Figure 2:
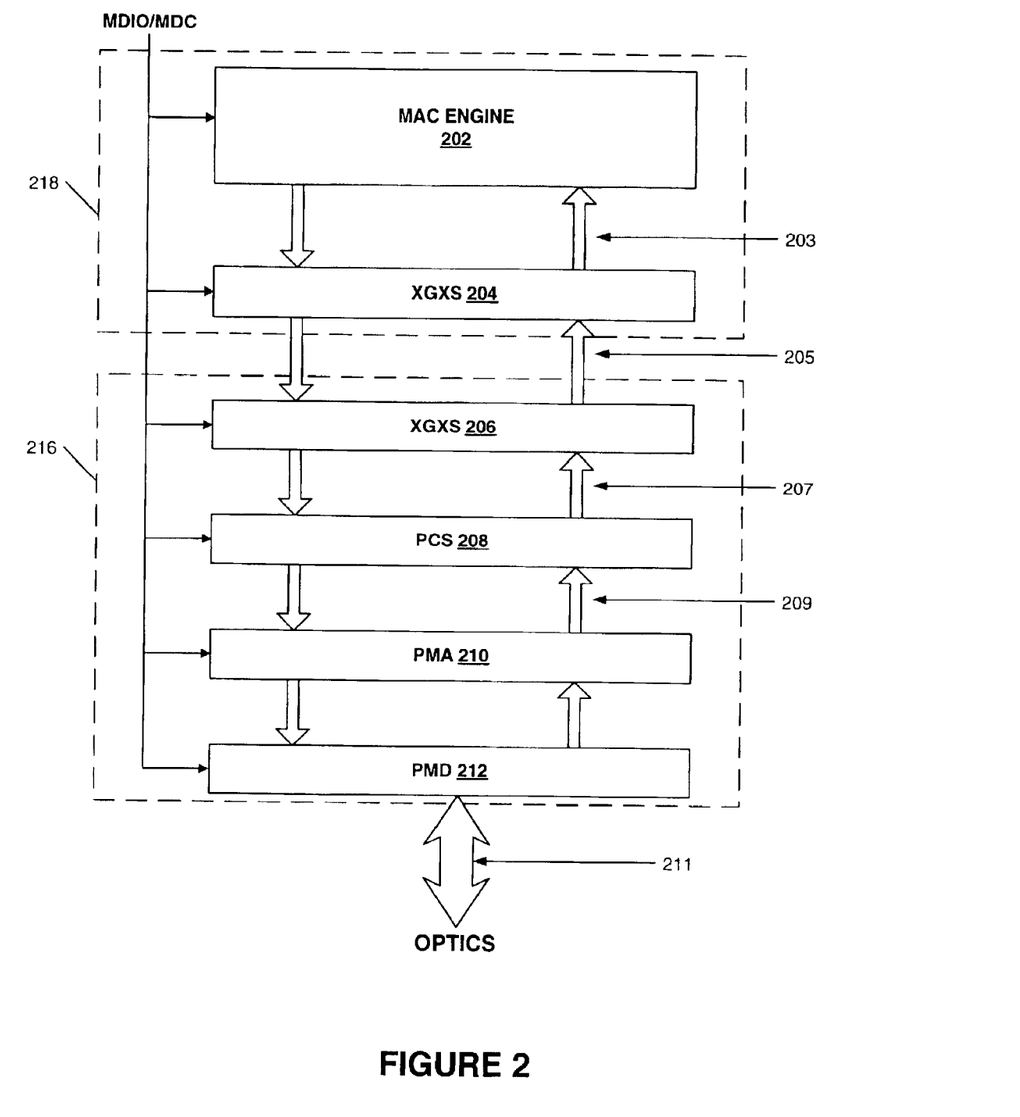
FIG. 2 is an illustration of the building blocks of a standard XENPAK 10 Gigabit Ethernet transceiver.

In keeping with the Ethernet standard of hot-pluggable transceivers, a Multi-Source Agreement consortium called XENPAK was formed to develop a standard requirement for hot-pluggable transceivers. FIG. 2 is an illustration of the building blocks of a standard XENPAK 10 Gigabit Ethernet transceiver. The Ethernet transceiver, referred to as the XENPAK module, is represented by block 216. XENPAK module 216 comprises the PMD sublayer 212, the PMA (Physical Medium Attachment) Sublayer 210, PCS 208, and XGXS 206.

As illustrated in FIG. 2, the optical medium is connected through Media Dependent Interface (MDI) 211 to the PMD (i.e., 212). The PMD converts the optical signal to serial electrical data. The PMA sublayer, 210, is a serializer/deserializer sublayer which converts the serial data to a 16-bit parallel signal at 209 for connection to PCS 208. PMA 210 also converts the 16 bit signal from the PCS to 1-bit serial for the PMD. PCS 208 does the encoding function such as 8B/10B or 64B/66B and provides the coded XGMII output at 207. XGXS 206 converts the 32-bit wide XGMII receive data to differential XAUI interface data at 205. It also converts the XAUI data 205 to XGMII. At the XAUI interface 205 is a XENPAK male connector from where signals in the XAUI lanes may be tapped. For instance, the MAC layer in the controller may have a XENPAK female connector so that the transceiver may easily plug into the controller device. The XAUI interface is preferred because it eliminates the need for 36+36 bit wide Tx and Rx Printed Circuit Board (PCB) traces which could result in skew problems thereby increasing the complexity of tests required to certify each 10 Gbe equipment. XAUI has a set of tests specified by the consortium for testing the integrity of the XAUI signals.

The MAC layer has its own XGXS sublayer (i.e., 204) to convert the XAUI lane signals back to XGMII since MAC Engine 202 interface is XGMII signals. Thus, the MAC engine may be used to test the integrity of the XAUI signals for example. A wide range of required tests are described in the IEEE 802.3ae Standard for 10 Gbe equipments. These tests include optical transceiver and receiver testing, electrical XAUI tests, and jitter tests.

Figure 3:
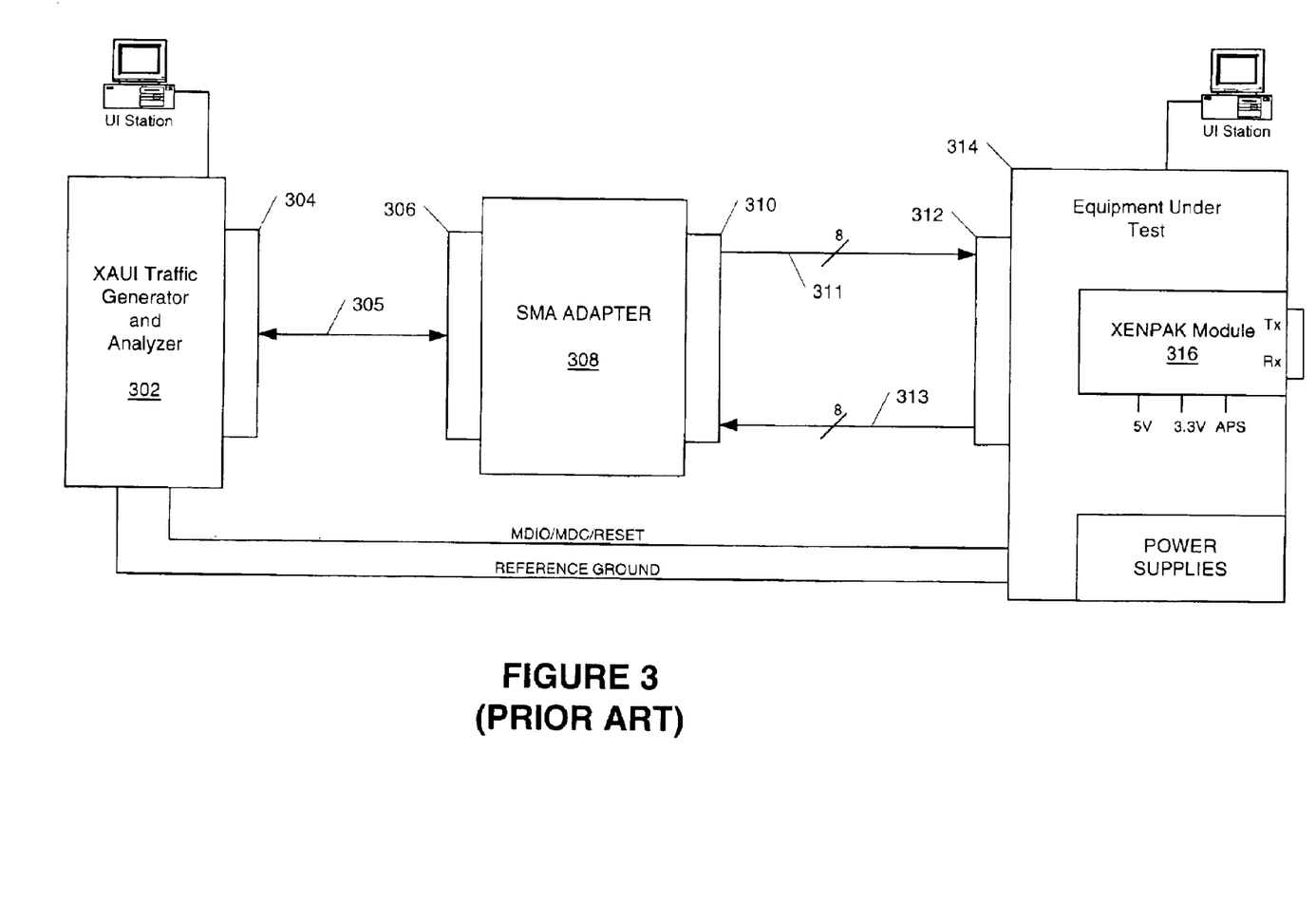
FIG. 3 is an illustration of prior art equipments for testing integrity of XAUI lane traffic.

Electrical XAUI tests require interface and ability to receive and transmit signals from the XAUI lanes. Any testing entails some form of destruction of data. Thus tapping into the XAUI lanes may compromise the integrity of the data. Therefore, good test equipments try to minimize the destructive impact on the actual data. FIG. 3 is an illustration of prior art equipments for testing integrity of XAUI lane traffic.

The test configuration includes a Device Under Test (DUT) 314, a XAUI Traffic Generator and Analyzer 302, and an SMA Adapter 308. DUT 314 includes connector 312 which provides connection to the electrical XAUI signals. Connector 312 comprises sixteen SMA connections: four differential pairs for transmit (eight total lines), and four differential pairs for receive (eight total lines). Eight copper cables 311 and eight copper cables 313 are connected to the SMA connectors of connector 312 to provide access to the XAUI signals. DUT 314 also contains XENPAK module 216 which provides access to optical transmission through its Tx and Rx terminals.

Prior art test equipments are specialized equipments that have connectors to receive the electrical signal. For instance, prior art XAUI Traffic Generator and Analyzer 302 includes connector 304 for receiving the electrical signals originating from the XAUI lanes. One problem is that prior art test equipments may not have the compatibility to directly receive XAUI electrical signals thus an adapter is typically used. In the illustration of FIG. 3, SMA adapter 308 (sometimes called break-out boxes) is used to convert the XAUI electrical signals from the SMA connectors to the test equipment connectors. For instance, the SMA Adapter 308 receives the differential XAUI electrical signals at connector 310. Connector 310 comprises eight pairs of SMA connectors, each pair carrying a differential XAUI electrical signal. The differential XAUI signals is then converted in SMA Adapter 308 and provided at connector 306. Connector 306 is compatible with connector 304 on test equipment 302. Transmission line 305, which typically comprises of copper wires, carries the electrical signal between the test equipment (i.e., 302) and the SMA Adapter (i.e., 308). Transmission line 305 and connector 306 combine to cause additional reflection losses and degradation of the XAUI electrical signals.

Transmission line 305 comprises a group of copper wires (cables) used to convey electrical data signals between test equipment 302 and the break-out box 308. Thus, there are additional elements, cable and connector, between the test equipment and the DUT. These additional elements contribute to destruction of the XAUI lane signals.

A cable is supposed to accurately convey a signal however losses accumulate along the cable path as the signal travels from one point to another because of imperfections. These imperfections are not necessarily due to manufacturing problems, but are mostly due to the physical nature of a cable. Like other physical devices, cables exhibit some losses when a signal is transmitted through them. Thus, the longer the cable length, the more losses accumulate. The accumulated transmission loss is known as "insertion loss" by those of ordinary skill in the arts. Additionally, connector 306, which is in the transmission path, contributes to the accumulated signal loss and thus more destruction of the XAUI lane signals.

Thus, a method for reliably and cheaply testing the integrity of 10 Gigabit Ethernet transmission components is desired.

SUMMARY OF THE INVENTION

The various embodiments of the invention described herein are directed to apparatuses and methods for testing the integrity of XAUI electrical lanes of a 10 Gigabit Standard optical network. More specifically, one or more embodiments of the invention provide a mechanism for extending the XAUI interface bus thus providing reliable, efficient, and cost effective means for testing the physical transmission of data in the XAUI electrical lanes.

Such testing is important because network performance, particularly high-speed optical networks, is dependent upon how efficiently data is handled by the network components. Thus, network engineers and others responsible for ensuring the network remains efficient find it helpful to use test devices to analyze the speed and accuracy of the various components and transport mechanisms that make up the network. In so doing, network problems can be proactively identified and resolved before becoming a significant hindrance to network performance. To effectively measure the network performance, the test device itself must be able to keep up with the transmission speeds of these components and the data traveling across the network. This also implies that the test mechanism must minimize distortion or destruction to the signal being tested. Because some networks (e.g., optical networks) function at very high speeds it is of the utmost importance that the test equipment be able to effectively receive the input data stream and operate on it with minimum destruction of the data. Embodiments of the invention provide access to the XAUI electrical signals while keeping insertion loss to a minimum.

Embodiments of the invention allow testing of the XAUI interface by extending the XAUI interface contained in a XENPAK interface connector. Extension of the XAUI interface bus makes it possible to test the XAUI electrical signals of a 10 Gigabit Ethernet device with minimum signal destruction. An embodiment of the present invention uses an extension of the XENPAK connector to generate and receive XAUI signals thus making it possible for any device with a XENPAK connector to become a XUAI tester with minimal components between the test equipment and the device under test. The reduction of components achieved with the present invention (only an AC-Coupling capacitor resides between the XENPAK connector and the SMA connector) results in significant reduction in insertion loss and signal degradation over prior art systems. Also, the availability of any device with a XENPAK interface as a XAUI tester eliminates any requirement for specialized test equipments, as in prior art devices.

The XAUI Extender card of the present invention fits in the slot of a test equipment that would normally house the XENPAK module. Thus, special connectors are not required to configure any XENPAK capable device as a test equipment of the present invention. The present invention eliminates the need for break-out boxes used in prior art test equipments by providing SMA connectors directly from an extension of the XAUI lanes.

Embodiments of the present invention may also include extension for the MDIO/MDC management bus. These signals are available from the XENPAK connector thus special connector is not required on the test equipment.

DETAILED DESCRIPTION OF THE INVENTION

The invention defines a method and apparatus for testing network components complying with Ethernet Standards such as the 10-Gigabit Standard with minimal signal degradation. In the following description, numerous specific details are set forth to provide a more thorough description of embodiments of the invention. It will be apparent, however, to one skilled in the art, that the invention may be practiced without these specific details. In other instances, well known features have not been described in detail so as not to obscure the invention.

The present invention comprises an apparatus to extend the XAUI or similar interface bus by providing test equipments access to electrical lanes similar to the XAUI lanes defined in the IEEE 802.3ae Standard. For instance, the invention allows the testing of the XAUI interface by extending the XAUI lanes contained in the XENPAK interface connector. An embodiment of the present invention uses an extension of the XENPAK connector to generate and receive XAUI type signals thus making it possible for any device with a XENPAK connector to become a XUAI tester with minimal components in between. By extending the XAUI or similar electrical lanes in accordance with embodiments of the present invention, components such as adapters and cables used in prior art systems are eliminated. Thus insertion loss and signal degradation is significantly reduced.

In addition, embodiments of the present invention provides that any device with a XENPAK or similar interface (e.g., capable of accepting a XENPAK type transceiver) is capable of acting as a XAUI tester thus eliminating any requirement for specialized test equipments, as in prior art devices.

Figure 4:
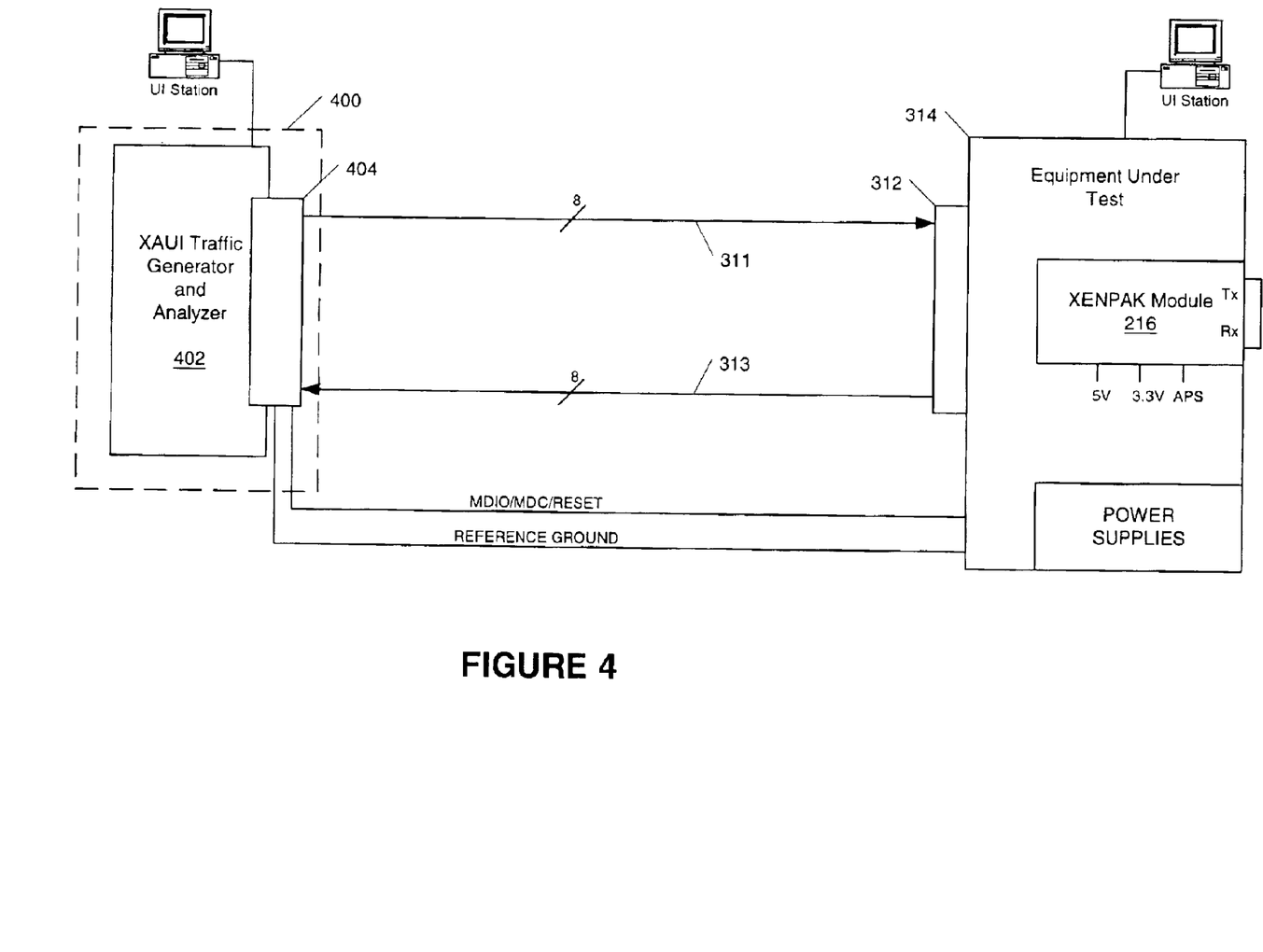
FIG. 4 is an illustration of an embodiment of a test configuration of the present invention.

FIG. 4 is an illustration of an embodiment of a test configuration of the present invention. As illustrated, the device under test (DUT) 314 is the same as in the prior art systems (FIG. 3). However, the present invention eliminates the break-out box (SMA Adapter 308), one connector (e.g., connector 306), and the cable (i.e., 305) connecting the test equipment to SMA Adapter 308. Thus, the present invention provides SMA connectors on test equipment 402 for directly connecting differential XAUI lanes 311 and 313 to device 404 on the test equipment (i.e., XAUI Traffic Generator and Analyzer 402). Embodiments of the present invention accomplish this by extending the XAUI lanes in a XENPAK connector of the test equipment. Thus, unlike in prior art devices, test equipment 402 of the present invention may be any device with a built-in XENPAK connector for receiving a XENPAK transceiver. The configuration of a XENPAK connector is described in the XENPAK Multi-Source Agreement (MSA) version 2.1.

In normal operation, a XENPAK transceiver module usually resides in a slot on test equipment 402. This XENPAK transceiver module slot provides the housing for device 404. Device 404 includes eight pairs of SMA connectors such as those contained in connector 312. Differential XAUI lanes 311 and 313 connect to the eight pairs of SMA connectors on device 404. Test device 400, which includes connecting device 404 and test equipment 402, is further illustrated in FIG. 5.

Figure 5:
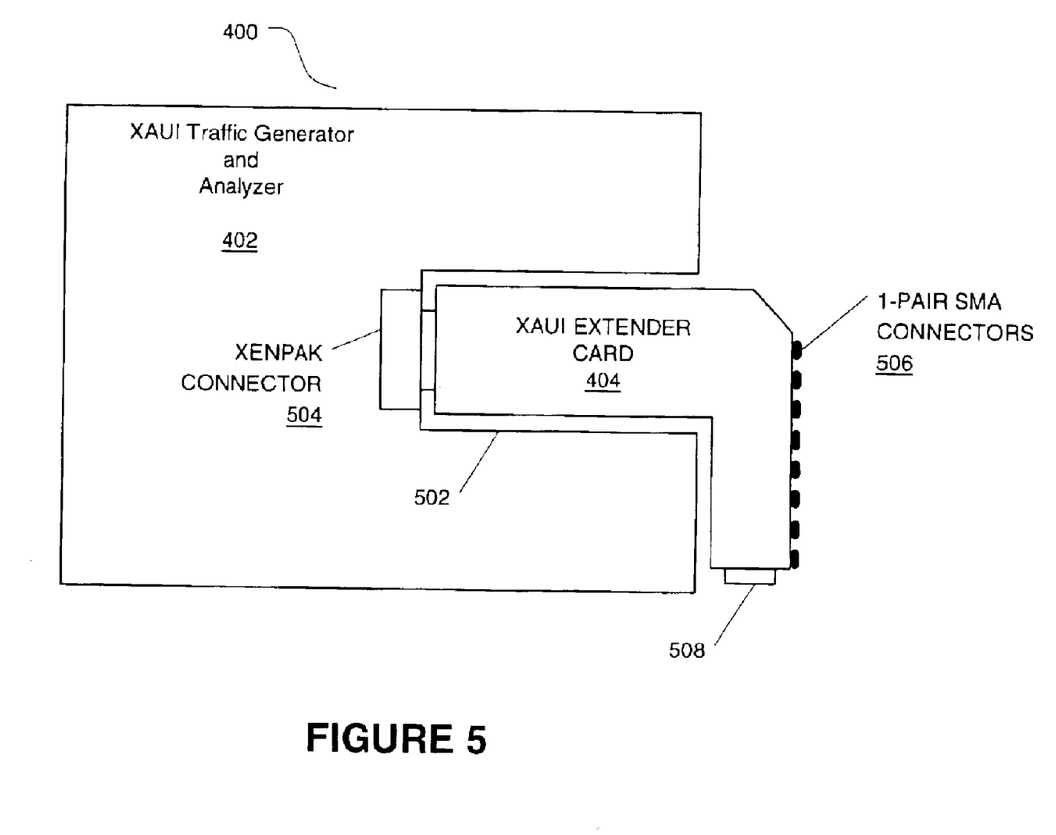
FIG. 5 is an illustration of test equipment with a XAUI Extender card in accordance with an embodiment of the present invention.

FIG. 5 is an illustration of test equipment with a XAUI Extender card in accordance with an embodiment of the present invention. Test equipment 400 comprises XAUI Traffic Generator and Analyzer 402, XENPAK connector 504, XENPAK transceiver slot 502 for housing the XENPAK module, and XAUI Extender Card 404. XENPAK connector 504 is typically a female connector. XAUI Extender card 404 includes eight pairs of SMA connectors (i.e., 506) for connecting the eight differential XAUI signals between the test equipment and the device under test. XAUI Extender card 404 may also include connector 508 for connecting the MDIO/MDC control lines. MDIO is Management Data Input/Output while MDC is Management Data Clock.

Figure 6:
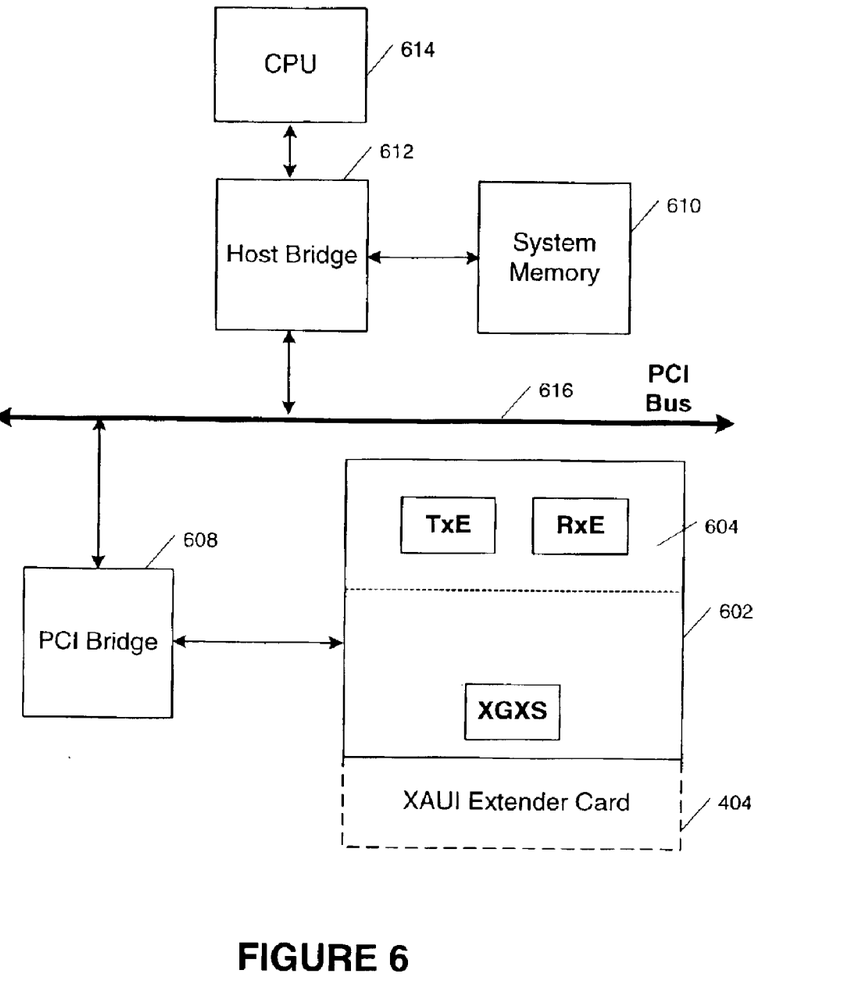
FIG. 6 is an illustration of a general-purpose test equipment having a XENPAK connector for 10 Gigabit Ethernet communications in accordance with an embodiment of the present invention.

Test device 400 is any computer equipment with available slot for a XENPAK transceiver module. FIG. 6 is an illustration of a general-purpose test equipment (e.g., computer system) having a XENPAK connector for 10 Gigabit Ethernet communications. The computer system comprises a Central Processing Unit (CPU) 614, memory device 610, host bridge 612 between CPU 614, memory 610, and PCI bus 616. The computer system further comprises traffic generator 604, which generates test frames for the XAUI electrical communications. PCI bridge 608 provides the bridge between the traffic generator and the PCI Bus (i.e., 616). The XAUI to XGMII converter sublayer (XGXS) 602 is included in the test apparatus. Also included in dashed lines is the XAUI Extender Card 404.

The test frame generator 604 generates any test frames desired by the user to satisfy the XAUI electrical test requirements. The generated test frames are converted to XAUI traffic by XGXS 602 and then transmitted through the XAUI Extender Card to the device under test. Thus, the XAUI extender card serves to extend the XAUI lanes.

Figure 7:
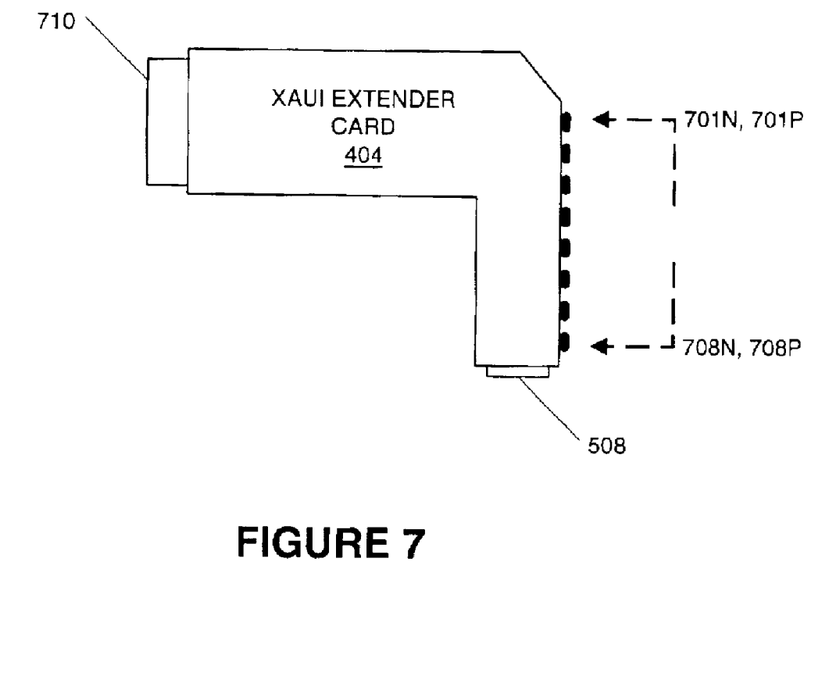
FIG. 7 is an illustration of a function outline of a XAUI Extender Card in accordance with an embodiment of the present invention.

An outline of a XAUI Extender Card is illustrated in FIG. 7. An extender card may be configured to have the same form fit as a XENPAK transceiver module, for example. The Extender card comprises XENPAK connector 710 (typically male), and eight pairs of SMA connectors 701N, 701P, through 708N, and 708P. The Extender card may also include connector 508 for extending the MDIO/MDC management bus. The eight differential pairs provide four lanes of traffic in each direction, i.e., each differential pair provides one XAUI lane. Thus, each SMA connector pair is a traffic lane (see Clause 47 of the IEEE 802.3ae standard).

Each differential pair is numbered with an "N" and a "P" where the "N" denotes the negative (−ve) of the differential XAUI signal pair and a "P" representing the positive (+ve) of the same differential XAUI signal pair. The XAUI Extender card extends the XAUI bus interface from XENPAK connector 710 to SMA connectors 701N, 701P, through 708N, and 708P. Extension of the XAUI interface bus is further illustrated in FIG. 8.

Figure 8:
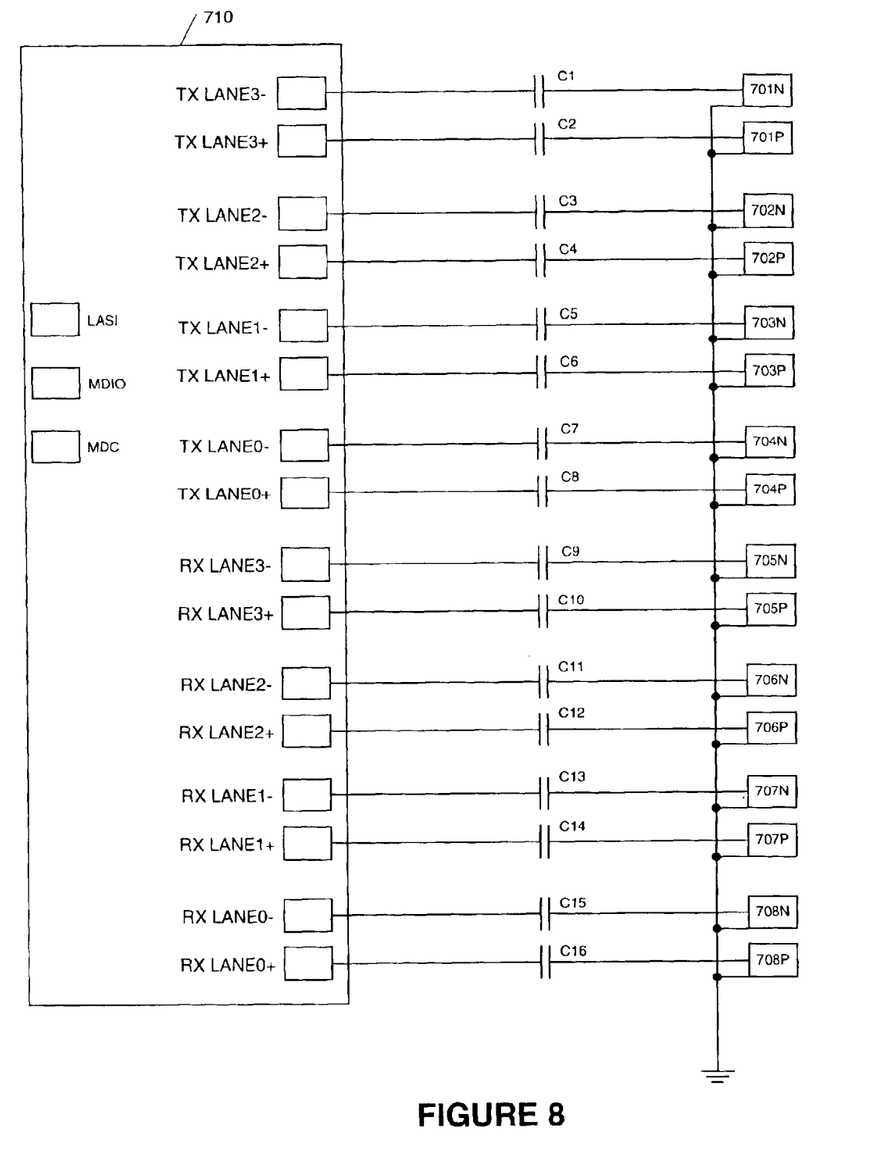
FIG. 8 is an illustration of extension of the XAUI interface bus in accordance with embodiments of the present invention.

As illustrated, the XAUI interface is extended by simply connecting each XAUI lane from the XENPAK connector 710, which is at the back-end of the Extender Card, through a DC-blocking capacitor to an SMA connector on the front-end of the Card. For instance, for the transmit lanes, XAUI traffic lane TX LANE3− is connected through DC-blocking capacitor C1 to SMA connector 701N, and XAUI traffic lane TX LANE3+ is connected through DC-blocking capacitor C2 to SMA connector 701P. XAUI traffic lane TX LANE2− is connected through DC-blocking capacitor C3 to SMA connector 702N, and XAUI traffic lane TX LANE2+ is connected through DC-blocking capacitor C4 to SMA connector 702P. XAUI traffic lane TX LANE1− is connected through DC-blocking capacitor C5 to SMA connector 703N, and XAUI traffic lane TX LANE1+ is connected through DC-blocking capacitor C6 to SMA connector 703P. XAUI traffic lane TX LANE0− is connected through DC-blocking capacitor C7 to SMA connector 704N, and XAUI traffic lane TX LANE0+ is connected through DC-blocking capacitor C8 to SMA connector 704P.

For the receive lanes, XAUI traffic lane RX LANE3− is connected through DC-blocking capacitor C9 to SMA connector 705N, and XAUI traffic lane RX LANE3+ is connected through DC-blocking capacitor C10 to SMA connector 705P. XAUI traffic lane RX LANE2− is connected through DC-blocking capacitor C11 to SMA connector 706N, and XAUI traffic lane RX LANE2+ is connected through DC-blocking capacitor C12 to SMA connector 706P. XAUI traffic lane RX LANE1− is connected through DC-blocking capacitor C13 to SMA connector 707N, and XAUI traffic lane RX LANE1+ is connected through DC-blocking capacitor C14 to SMA connector 707P. XAUI traffic lane RX LANE0− is connected through DC-blocking capacitor C15 to SMA connector 708N, and XAUI traffic lane RX LANE0+ is connected through DC-blocking capacitor C16 to SMA connector 708P. Thus, all the XAUI traffic lanes are connected from the XENPAK connector in the backend of the XAUI Extender Card through DC-blocking capacitors to SMA connectors in the front end of the Extender card.

In one or more embodiments, the extension of the XAUI lanes as described herein may be implemented on a low rate Printed Circuit Board (PCB). Use of such low rate PCB's may be achieved by tightly controlling the impedance of the transmission lines. For instance, the impedance may be controlled using tight specifications for trace width, separation between traces of the same pair, and separation between different pairs. Controlling impedance to a fixed value (e.g., 50 Ohms) minimizes reflection losses through the extender card.

In addition, embodiments of the present invention accomplish reduction of insertion loss by minimizing the components between the XENPAK interface at the back-end and the SMA connectors at the front-end. For instance, in the embodiment of FIG. 8, only a DC-blocking capacitor is present between a XENPAK connector pin and a XAUI SMA connector.

Figure 9:
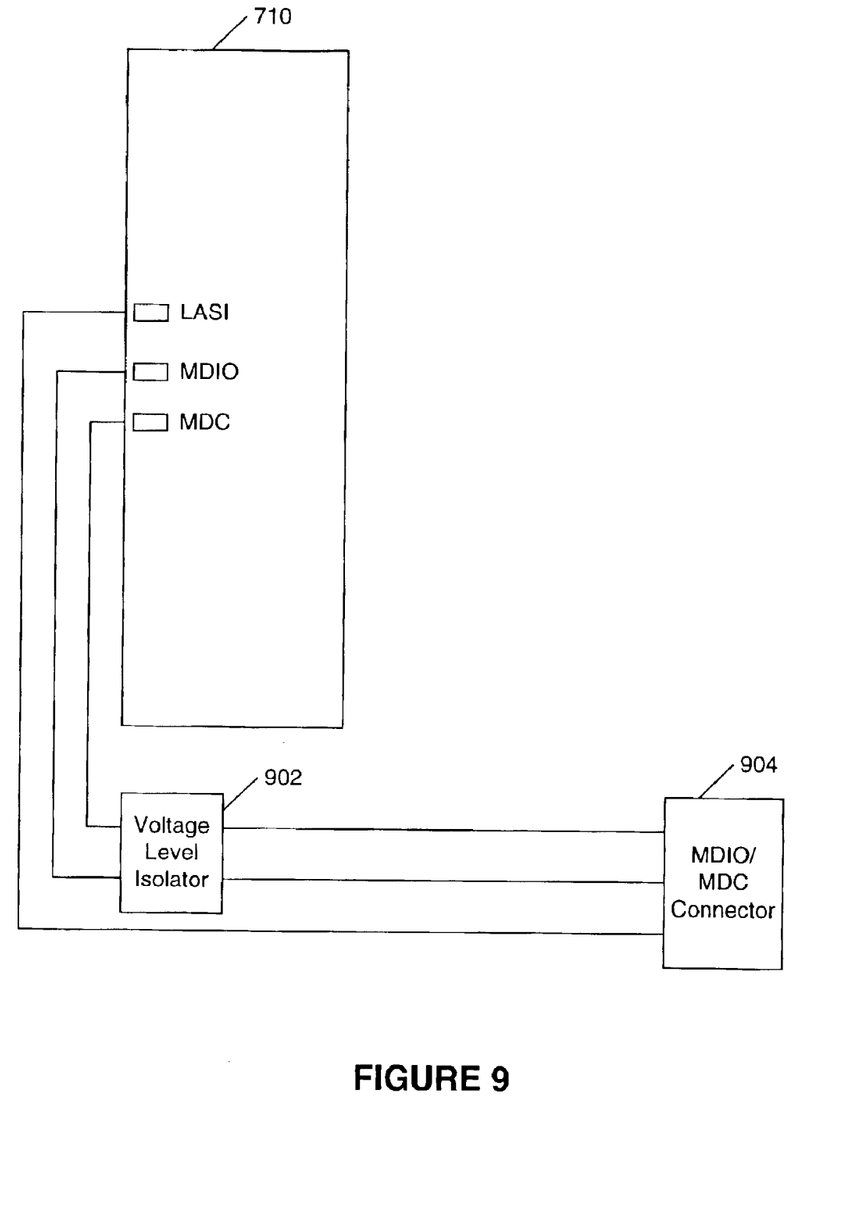
FIG. 9 is an illustration of the extension of the MDIO/MDC management bus from the XENPAK connector to a connector on the front end of the XAUI Extender Card in accordance with an embodiment of the present invention.

An embodiment of the present invention may provide an extension of the MDIO/MDC management bus. FIG. 9 is an illustration of the extension of the MDIO/MDC management bus from the XENPAK connector to a connector (for example, an RJ-45) on the front end of the XAUI Extender Card in accordance with an embodiment of the present invention. The LASI pin of XENPAK connector 710 at the backend of the XAUI Extender Card is connected to MDIO/MDC connector 904. Similarly, the MDIO and MDC pins of XENPAK connector 710 are connected to voltage level isolator 902. Voltage level isolator 902 may be any suitable voltage level protection device. For example, a CMOS voltage clamp device may be used to achieve the function of voltage level protection.

From voltage clamp 902, the MDIO/MDC signals are extended to connector 904, which is located at the front-end of the XAUI Extender Card. Including an extension of the MDIO/MDC management bus to the XAUI Extender Card provides for true universal test equipment. Thus any device capable of accepting a XENPAK transceiver module may be used as a test equipment for the 10 Gigabit Ethernet XAUI electrical interface bus.

Thus, a method and apparatus for testing network components complying with the 10 Gigabit Ethernet Standard has been described in conjunction with one or more specific embodiments. The invention is defined by the claims and their full scope of equivalents.

What is claimed is:

1. An apparatus for extending the Attachment Unit Interface (XAUI) lanes comprising:
   a first connector comprising a plurality of XAUI electrical lanes and a management bus;
   a plurality of capacitors connected to said plurality of XAUI electrical lanes, wherein at least one of said plurality of capacitors is connected on a first side to one of said plurality of XAUI electrical lanes on said first connector;
   a plurality of second connectors, each one of said plurality of second connectors connected to said at least one capacitor on a side opposite to said first connector; and
   a third connector coupled to said first connector for extending said management bus.

2. The apparatus of claim 1, wherein said first connector is a XENPAK Multi Source Agreement (MSA) connector.

3. The apparatus of claim 1, wherein each of said plurality of second connectors is an SMA connector.

4. The apparatus of claim 1, wherein said plurality of XAUI electrical lanes comprises eight differential pairs of electrical signals.

5. The apparatus of claim 1, wherein said management bus comprises:
   a management data input/output signal; and
   a management data clock signal.

6. An apparatus for testing XAUI electrical lanes comprising:
   a computer device having a slot for accepting a XENPAK MSA transceiver module;
   a first XENPAK MSA connector in said slot, said first XENPAK MSA connector having a plurality of XAUI electrical lanes; and
   an extender device inserted in said slot and connected to said first XENPAK MSA connector; said extender device providing an extension of said XAUI electrical lanes to an external device;

wherein said extender device comprises:

a second XENPAK MSA connector having a plurality of XAUI electrical lanes;

a plurality of capacitors connected to said plurality of XAUI electrical lanes, wherein at least one of said plurality of capacitors is connected on a first side to one of said plurality of XAUI electrical lanes on said second XENPAK MSA connector; and a plurality of third connectors, each one of said plurality of third connectors connected to said at least one capacitor on a side opposite to said second XENPAK MSA connector.

7. The apparatus of claim 6, wherein said first XENPAK MSA connector and said second XENPAK MSA connector are capable of mating pin by pin to extend said XAUI electrical lanes to said plurality of third connectors.

8. The apparatus of claim 6, wherein each of said plurality of third connectors is an SMA connector.

9. The apparatus of claim 6, wherein said plurality of XAUI electrical lanes comprises eight differential pairs of electrical signals.

10. The apparatus of claim 6, wherein said first and second XENPAK MSA connectors further comprise a management bus interface.

11. The apparatus of claim 10, further comprising:

a fourth connector coupled to said second XENPAK MSA connector for extending said management bus interface.

12. The apparatus of claim 10, wherein said management bus comprises:

a management data input/output signal; and a management data clock signal.

13. An apparatus for testing XAUI electrical lanes comprising:

a computer device having a slot for accepting a XENPAK MSA transceiver module, said slot comprising a first XENPAK MSA connector; and an extender device inserted in said slot for accepting a XENPAK MSA transceiver module; said extender device providing an extension of a plurality of XAUI electrical lanes to an external device;

wherein said extender device comprises:

a second XENPAK MSA connector at a first end of said extender device, said second XENPAK MSA connector having a plurality of XAUI electrical lanes;

a plurality of third connectors at a second end of said extender device; and a plurality of capacitors connected to said plurality of XAUI electrical lanes on said second XENPAK MSA connector and said plurality of third connectors, wherein each of said plurality of capacitors is connected on a first side of said capacitor to one of said plurality of XAUI electrical lanes on said first end of said extender device and on a second side of said capacitor to one of said plurality of third connectors on said second end of said extender device.

14. The apparatus of claim 13, wherein said first XENPAK MSA connector and said second XENPAK MSA connector mate pin by pin to extend said XAUI electrical lanes to said plurality of third connectors.

15. The apparatus of claim 13, wherein said plurality of third connectors are SMA connectors.

16. The apparatus of claim 15, wherein said plurality of SMA connectors are coupled to a second plurality of SMA connectors located on an equipment under test.

17. An apparatus for extending Standard Ethernet Electrical lanes comprising:

a first connector comprising a plurality of Ethernet electrical lanes and a management bus;

a plurality of capacitors connected to said plurality of Ethernet electrical lanes, wherein at least one of said plurality of capacitors is connected on a first side to one of said plurality of Ethernet electrical lanes on said first connector;

a plurality of second connectors, each one of said plurality of second connectors connected to said at least one capacitor on a side opposite to said first connector; and a third connector coupled to said first connector for extending said management bus.

18. The apparatus of claim 17, wherein said electrical lanes are XAUI electrical lanes.

* * * * *